United States Patent [19]

Meier

[11] Patent Number: 4,775,230
[45] Date of Patent: Oct. 4, 1988

[54] SUPPORT SYSTEM FOR A TELESCOPE MIRROR

[75] Inventor: Hans-Jürgen Meier, Aalen, Fed. Rep. of Germany

[73] Assignee: Carl-Zeiss-Stiftung, Heidenheim, Fed. Rep. of Germany

[21] Appl. No.: 130,931

[22] Filed: Dec. 9, 1987

[30] Foreign Application Priority Data

Dec. 10, 1986 [DE] Fed. Rep. of Germany ....... 3642128

[51] Int. Cl.$^4$ .......................... G02B 7/18; G02B 5/10
[52] U.S. Cl. .................................... 350/611; 350/607
[58] Field of Search ............... 350/611, 607, 609, 608

[56] References Cited

FOREIGN PATENT DOCUMENTS 3521973 7/1986 Fed. Rep. of Germany ...... 350/607
987988 4/1951 France ............................. 350/611

Primary Examiner—Jon W. Henry
Attorney, Agent, or Firm—Walter Ottesen

[57] ABSTRACT

A support system includes a passive hydraulic mounting with branched loads and an active mounting by means of which additional forces can be applied to the support points. The mirror is actively deformed with the aid of these additional forces. The additional forces for the active mounting are produced by a purposeful variation of the surfaces or radii of pressure plates on which the mirror rests at the support points.

8 Claims, 5 Drawing Sheets

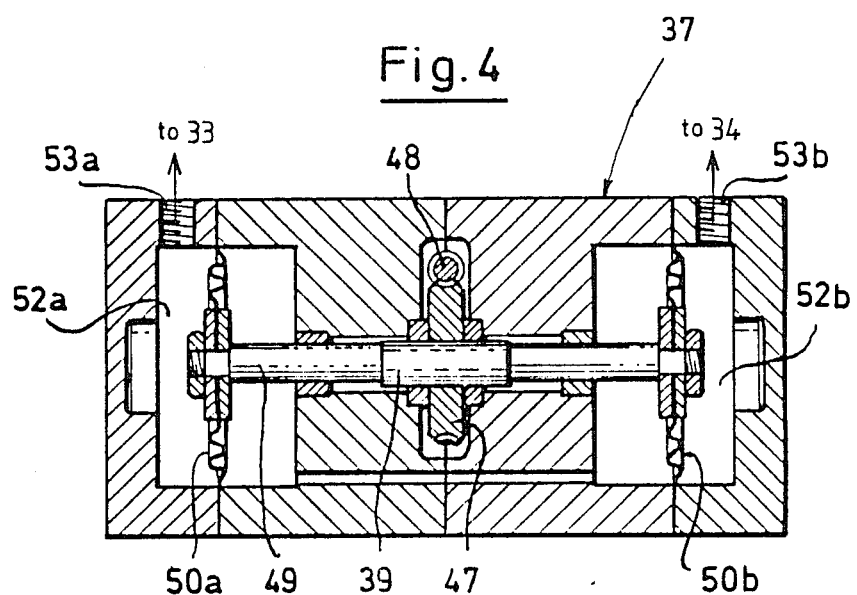
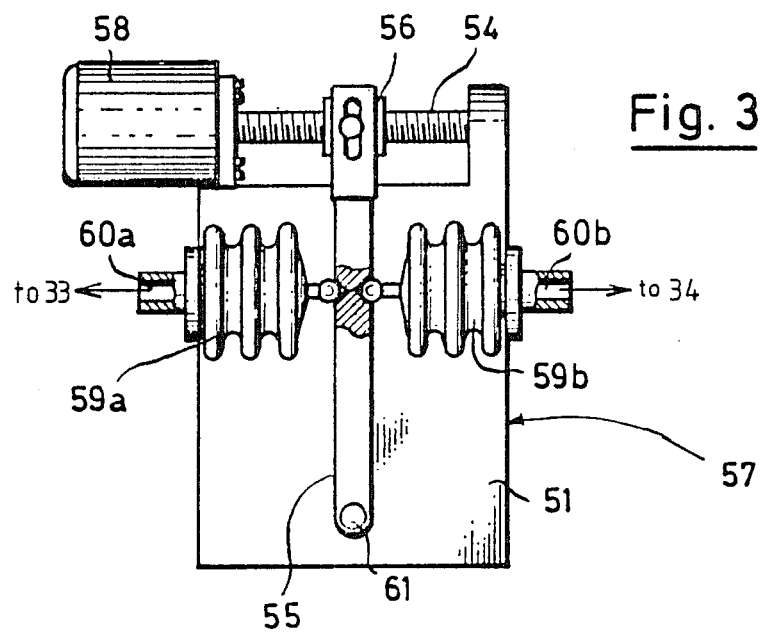

SUPPORT SYSTEM FOR A TELESCOPE MIRROR

FIELD OF THE INVENTION

The invention relates to a support system for a telescope mirror having an active support arrangement wherein the forces applied by the individual support points to the mirror body are adjustable and controllable. The support system further includes a passive and astatic support arrangement in the form of a hydraulic system wherein the load is branched.

BACKGROUND OF THE INVENTION

In building astronomical mirror telescopes, it must be ensured that the mirror retains its shape unchanged in every position. That is, the mirror must retain its shape independently of the inclination of its surface to the direction of the force of gravity. The usual requirements for the exactness of shape are a few 10 nm RMS.

A special support arrangement of the mirror is required for this purpose. This support arrangement prevents deformations of the mirror which are inevitably introduced by the carrier structure as a result of external forces and temperature fluctuations. For large telescopes, these deformations lie in the region of several hundred $\mu$m and therefore exceed the desired exactness of shape by several orders of magnitude.

Heretofore, passive support systems were almost exclusively used for supporting such mirrors and for taking up the axial and radial mirror load. A known axial support system is described in the ZEISS-Information, Volume 27, Book 94 (1982), pages 8 and 9. In systems such as described in this publication, the support system distributes the support forces evenly through a sufficient number of individual support points on the backside of the mirror. The number and arrangement of the support points depend on the size, the total weight, and resistance to bending of the mirror.

For some time, there has been a tendency to make the mirrors ever thinner, yet their surface ever larger. In order to simultaneously satisfy the increasing requirements on the exactness of shape of the mirrors in spite of reduced resistance to bending, it is intended that the mirrors be forced into the correct shape by the purposeful application of external forces. For this purpose, it already has been proposed to use a so-called "active" supporting arrangement wherein the forces acting on the support points of the axial support system are computer-calculated and applied to the rearward side of the mirror by means of actuators whose forces are adjusted individually according to the computer-calculated distribution.

When the forces exerted by the actuators are correctly adjusted, the mirror can be purposely deformed in the sense of a restoration of the disturbed exactness of shape. In that case, residual errors due to the work done on the mirror surface also can be cancelled.

Such a support system is known, for example, from an article entitled "From Passive Support Systems to the NTT Active Support" by R. N. Wilson, F. Franza and L. Noethe which was published in the Proceedings of the IAU Colloquium No. 79: "Very large Telescopes, their Instrumentation and Programs", Garching, Federal Republic of Germany, Apr. 9 to 12, 1984, pages 23 to 40. The actuators proposed here consist of two essential elements: a sensor which measures the partial weight of the mirror acting on the individual support point and an electromagnetic arrangement in the form of a motor-driven lever system which applies the precalculated force. With the aid of a control arrangement, the motor is so adjusted that the force measured by the sensor corresponds to a calculated value which is composed of the passive base load and the additional force necessary for the deformation.

Since the partial amount of the support force to be controlled in this system is very small and only accounts for about 1% of the total force of a support point and since the sensor utilized for controlling the force measures the total force, very high requirements are imposed on the accuracy and time stability of the sensor which are not adequately satisfied. For this reason, it is difficult to actually apply the precalculated ideal force distribution onto the rearward side of the mirror. This difficulty is particularly introduced by the situation that an additional force purposely applied to a point requires a change of the forces at all the other points, which cannot self-adjust but can again be adjusted only by actively controlling all the other points.

German Pat. No. 35 21 973 discloses a support system for a telescope mirror which includes an active supporting arrangement wherein individually adjustable additional forces can be applied to the mirror at individual support points with the aid of actuators. In addition to this active support, the system provides for a passive support in the form of a hydraulic system wherein the load is branched. The actuators are linear motors which are connected in a force-tight manner to the supports of the passive support arrangement. The configuration of a support unit according to this known support system is shown in FIG. 1a of the drawings.

FIG. 1b of the drawings is a schematic showing the distribution of the support points of an axial support system on the rear side of a mirror. In FIG. 1b, reference numeral 15 identifies the mirror to be supported. The mirror body is supported by 27 supports with respect to its axial weight components of which eighteen are arranged at equal spacing on an outer circle and nine are arranged on an inner circle with a smaller diameter. The supports are part of a hydraulic astatic load relieving system with the pressure chambers corresponding to the supports being arranged into three groups. The pressure chambers of these groups are interconnected by lines 5 and 6. The groups are arranged in respective ones of three 120° sectors A, B and C. As a consequence of this distribution, the hydraulic support is indifferent with respect to tilting of the mirror.

Each of the 27 support points is superposed with an additional force of a precalculated amount with the aid of control unit 18.

Referring to FIG. 1a, each support point includes a housing 1 which is partitioned by a membrane 2 into an upper chamber 3 and a lower chamber 4. The chambers are filled with a hydraulic fluid which for the purpose of pressure equalization is connected with the corresponding chambers of the other support points of the system by means of lines (5, 6). The membrane 2 carries a centered plate 7 which is connected to a push rod 8 and the plate 16 is attached to the latter for carrying the mirror. The plate 7 also includes a stub-like rod 9 formed thereon for transmitting the calculated additional force for the active mirror deformation. The rods (8, 9) are sealed with respect to the housing 1 with the aid of membranes (10, 11).

Two pressure systems separate from each other are formed because of the division into two chambers (3, 4).

If the mirror 15 is always in the horizontal position, then only the lower chambers 4 would be required. Since the mirror, however, must be tilted, and in an inclined position the weight of the hydraulic fluid itself additionally acts on the support points, and indeed differently depending on the positions of the support points, the upper chambers 3 are provided and compensate for this additional pressure.

The lower extension of the pressure plate 7 formed as a stub-like rod 9 is connected to the permanent-magnet armature 12 of a linear motor. The armature 12 exerts a force in the direction of the rod 9 which is proportional to the current through the coil 13 which surrounds the armature 12 and is connected to the control unit 18. This force is transmitted directly through the stub-like rod 9, the plate 7, the rod 8, and the carrier plate 16 onto the rearward side of the mirror 15 and so is superposed on the supporting force of the plate 7 of the passive hydraulic support system.

The known support system is indeed self-adjusting with reference to the base load of the mirror and requires only an adjustment of the additional force necessary for the active support. However, this support system has the shortcoming that also in the stationary state, energy will be transferred from the linear motors to the support points. Localized heat sources arise in this way which can deform the mirror and the support system.

SUMMARY OF THE INVENTION

It is the object of the invention to provide an actively operating support system which functions in a stationary condition without using energy. It is another object of the invention to provide such a support system which can be operated on a hydraulic basis in combination with a passive, astatic mounting system.

According to a feature of the invention, the additional forces required for the active support at the support points of the mirror are taken from the pressure already present in the hydraulic system of the passive support by means of which the base load of the mirror is carried. The amount of this additional force can be adjusted, wherein the active surface of the pressure plate or of the housing surrounding the plate is varied at the particular support point. This notwithstanding, the base load taken up by the passive hydraulic system remains completely uncoupled from the active system. This type of adjustment of the additional force operates without the consumption of energy during stationary operation, so that a thermal disturbance of the mirror by the active support cannot arise.

The support system of the invention is suitable not only for the mirrors which are operated on earth under the influence of the force of gravity but can also be applied in the weightless region, that is, for mirrors operated outside the earth atmosphere. There, the hydraulic passive system does not have to take up the base load (weight of the mirror); however, the hydraulic system with branched loads provides that the counter-force to the additional force to be developed at a point for the active support distributes itself evenly on the remaining points of the support arrangement. The effort for controlling the additional forces necessary for adjusting the active support can be maintained very small.

An essential point of the invention is the manner in which the effective active surface is purposely changed in the passive hydraulic mounting system. For this purpose, a bellows is provided which can be made rigid and which is part of either the pressure plate or the enclosure which surrounds the pressure plate.

BRIEF DESCRIPTION OF THE DRAWINGS

The invention will now be explained with reference to the drawings wherein:

FIG. 3 is a schematic of an actuator by means of which the effective active surface of the pressure plate of FIG. 2 can be adjusted or by means of which the effective active surface of the pressure plate of FIG. 5 can be adjusted;

FIG. 4 is an alternate embodiment of the actuator shown in FIG. 3;

DESCRIPTION OF THE PREFERRED EMBODIMENTS OF THE INVENTION

Figure 1B:
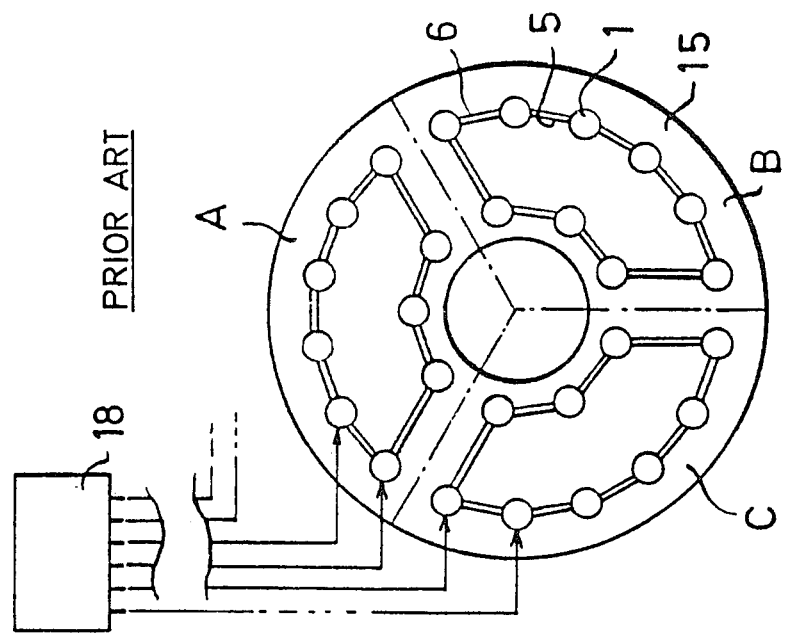
FIG. 1b is a schematic of the distribution of the support points of an axial support on the rear side of a mirror which was also discussed above.

FIG. 1 was already explained in detail in the introductory paragraphs directed to the description of the prior art. A description of the function of a combined active and passive mirror support is provided above and in German Pat. No. 35 21 973 referred to in the introduction.

According to the invention, one can dispense with the linear motor (12, 13) at the support points shown in FIG. 1. For this purpose, the pressure plate 7 is modified as shown in FIG. 2.

Figure 1A:
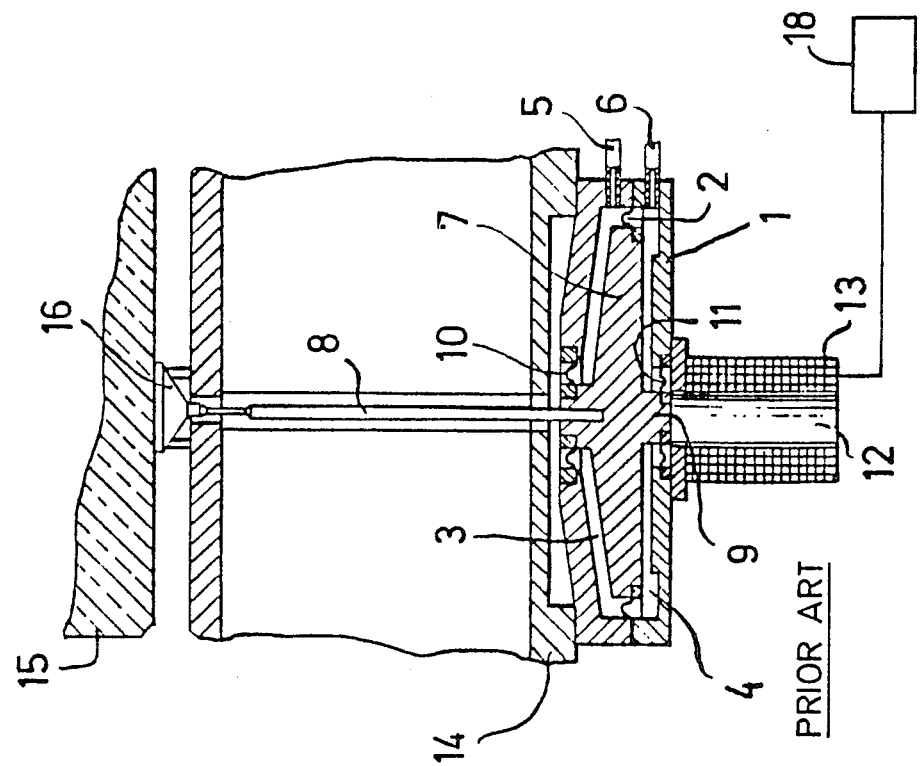
FIG. 1 is a detailed section view of portions of an actuator at a support point of a combined active and passive mounting arrangement of the prior art discussed above.
Figure 2:
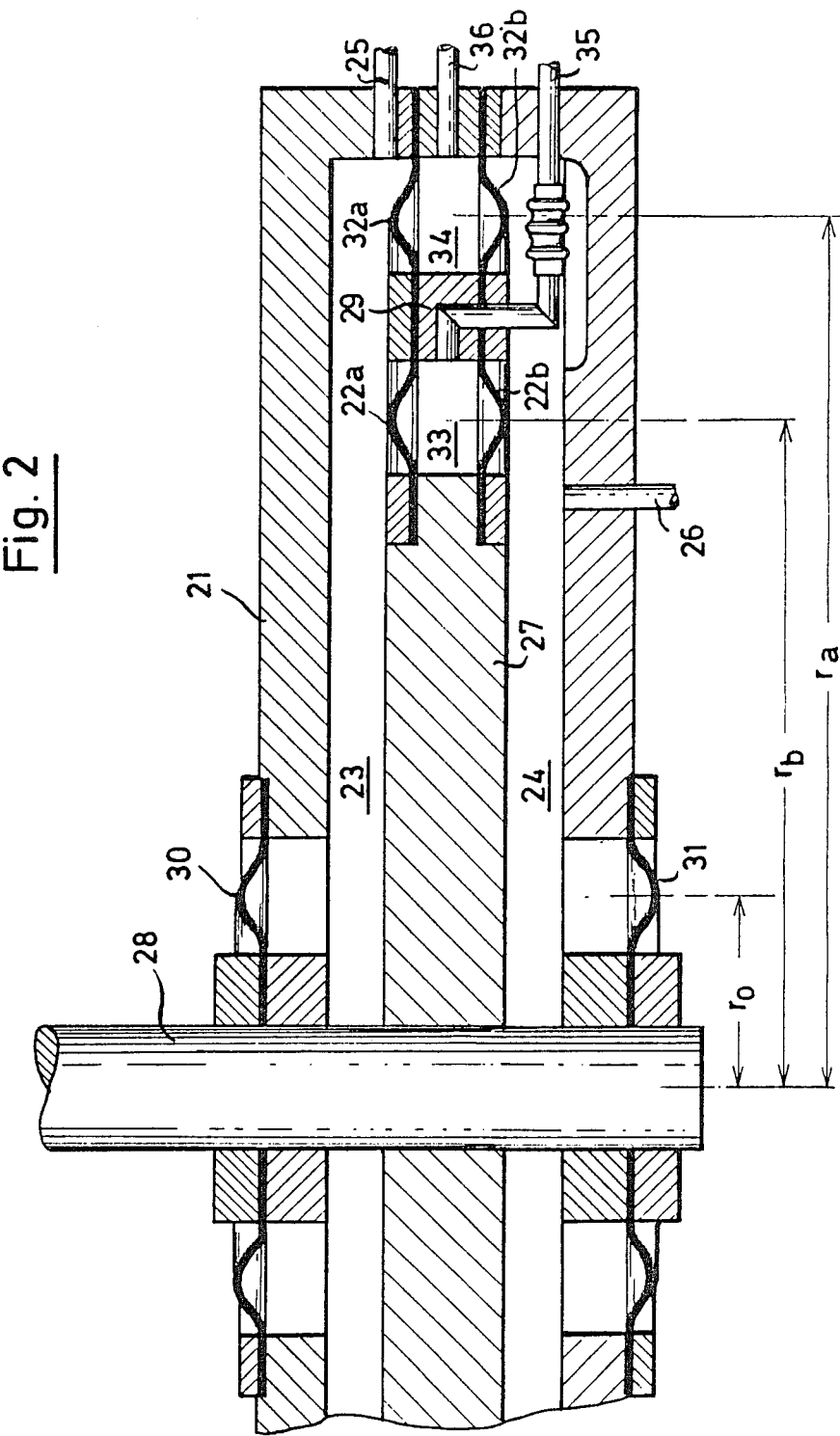
FIG. 2 is a schematic, partially in section, which shows a pressure plate of an actuator at the support point for a combined active and passive support system according to an embodiment of the invention.

In FIG. 2, the push rod which carries the load of the mirror at one of the support points is identified with reference numeral 28. This push rod 28 is connected to the pressure plate 27 in the housing 21 which encloses both pressure chambers (23, 24). Membranes (30, 31) seal the movably journalled push rod 28 with respect to the housing 21. The chambers (23, 24) correspond to the pressure chambers (3, 4) of FIG. 1a and also are here separated from each other. Conduits (25, 26) communicate with the chambers (23, 24), respectively, and provide respective connections to corresponding chambers at other support points of the mirror.

The total force $Q_t$ exerted by the push rod 28 on the mirror is given by:

$$Q_t = (P_{23} - P_{24}) \cdot \pi \cdot (r_{eff}^2 - r_o^2) \quad (1)$$

wherein:

$r_{eff}$ is the effective outer radius of the circularly-shaped pressure plate 27; and, $r_o$ is the inner radius which excludes the ineffective inner portion of the pressure plate 27.

In contrast to the supporting arrangement according to the prior art shown in FIG. 1a, both chambers (23, 24) are not separated from each other by a simple membrane; but instead, two double membranes [(22a, 22b) and (32a, 32b)] are provided which are connected to each other through a rigid intermediate ring 29. The double membrane (22a, 22b) is connected on one edge to the pressure plate 27, and the double membrane (32a, 32b) is fastened on one edge to the housing 21 which encloses the pressure plate 27. In this way, double membrane sets [(22a, 22b) and (32a, 32b)] enclose respective annular chambers (33, 34).

The annular chambers (33, 34) communicate with corresponding ones of two further pressure conduits (35, 36). If one of the chambers (33 or 34) is now subjected to pressure, then the corresponding bellows defined by the double membrane sets [(22a, 22b) or (32a, 32b)] stiffens. By means of this stiffening, the intermediate ring 29 becomes coupled in a force-tight manner to either (a) the pressure plate 27 or, (b) the housing 21, depending upon which one of the two sets of bellows [(22a, 22b) or (32a, 32b)] is more strongly stiffened.

Considering both cases (a) and (b) at their limit values, that is, when one of the bellows is inflated hard, and the other is under no pressure, it then becomes apparent that in both of these cases the effective radius $r_{eff}$ of the pressure plate 27 connected with the push rod 28 is different, and can take on the values designated in FIG. 2 by $r_a$ and $r_b$.

Because the force which the push rod 28 exerts on the associated support point of the mirror is proportional to the area of the pressure plate 27, the change of the effective radius (or, stated otherwise, the change in the effective area of the pressure plate 27) described above produces the variable additional force required for the active mirror support in that the pressure in the chambers (33, 34) are varied in opposite directions to each other.

It is here noted that the effective radius of the pressure plate 27 can be adjusted smoothly between the above-mentioned limit values $r_a$ and $r_b$ and is a function of the pressures ($P_{33}$ and $P_{34}$) inside respective ones of the bellows [(22a, 22b) and (32a, 32b)].

The interiors (33, 34) of the respective bellows [(22a, 22b) and (32a, 32b)] communicate by means of respective feed pipes (35, 36) with corresponding ones of openings (60a, 60b) of an actuator in the form of an electrically controllable pressure cell as shown in the embodiment of FIG. 3.

The actuator is identified in FIG. 3 by reference numeral 57 and includes two pressure bodies (59a, 59b) lying opposite each other. The pressure bodies (59a, 59b) are each attached at one end to a common base plate 51 and the outflow openings (60a, 60b) are at this end as shown. The volume of the pressure bodies (59a, 59b) can be varied in opposite directions with the aid of a pivotally mounted lever 55 which pivots about the axis 61. For this purpose, the pivoting lever 55 is provided with a nut 56 which is driven by a threaded spindle 54 connected to an electric motor 58. In order to achieve an active mirror support, a separate actuator is provided for each support point which is set according to the predetermined changes in shape of the mirror at this point, whereby the pressure in the chambers (33, 34) and therewith the rigidity of the bellows [(22a, 22b) and (32a, 32b)] will be purposely adjusted.

A further embodiment of an actuator 37 is shown in FIG. 4. This actuator 37 is changed in its structural configuration but not functionally. Here, a pinion 47 is disposed on a threaded nut 39 and is driven by the worm gear 48 mounted on the shaft of a motor not visible in the cross section shown. This nut 39 drives a threaded spindle 49 with which the membranes (50a, 50b) of two pressure cells (52a, 52b) are fixedly connected with each other. Correspondingly, the pressure in the systems communicating with the openings (53a, 53b) of the respective pressure cells (52a, 52b) can be set with this actuator; that is, stiffness of both bellows [(22a, 22b) and (32a, 32b)] communicating therewith can be set with this actuator.

The additional forces for the active mirror support with the embodiment of FIG. 2 can be generated only when a pressure difference is present in both chambers (23, 24), that is, when the pressures $P_{23}$ and $P_{24}$ are different from each other. In this connection, reference is made to equation (1).

This case is always fulfilled for mirrors installed on earth because the pressure difference ($P_{23}-P_{24}$) does serve precisely for carrying the weight of the mirror.

However, the principle shown by means of FIG. 2 can be used also for the active deformation of mirrors which are in weightless space. Because the pressures $P_{23}$ and $P_{24}$ in both chambers (23, 24) of FIG. 2 are equal in this case, the active additional force cannot, however, be produced in that the effective area of the pressure plate 27 is changed uniformly for both chambers (23, 24); this assumes that a hydraulic branched-load system of support points is applied to the mirror. The additional force much rather must be produced by an asymmetry in the surfaces of the pressure plate 27 bordering on the chambers (23, 24). This case is shown in the embodiment according to FIG. 5.

Figure 5:
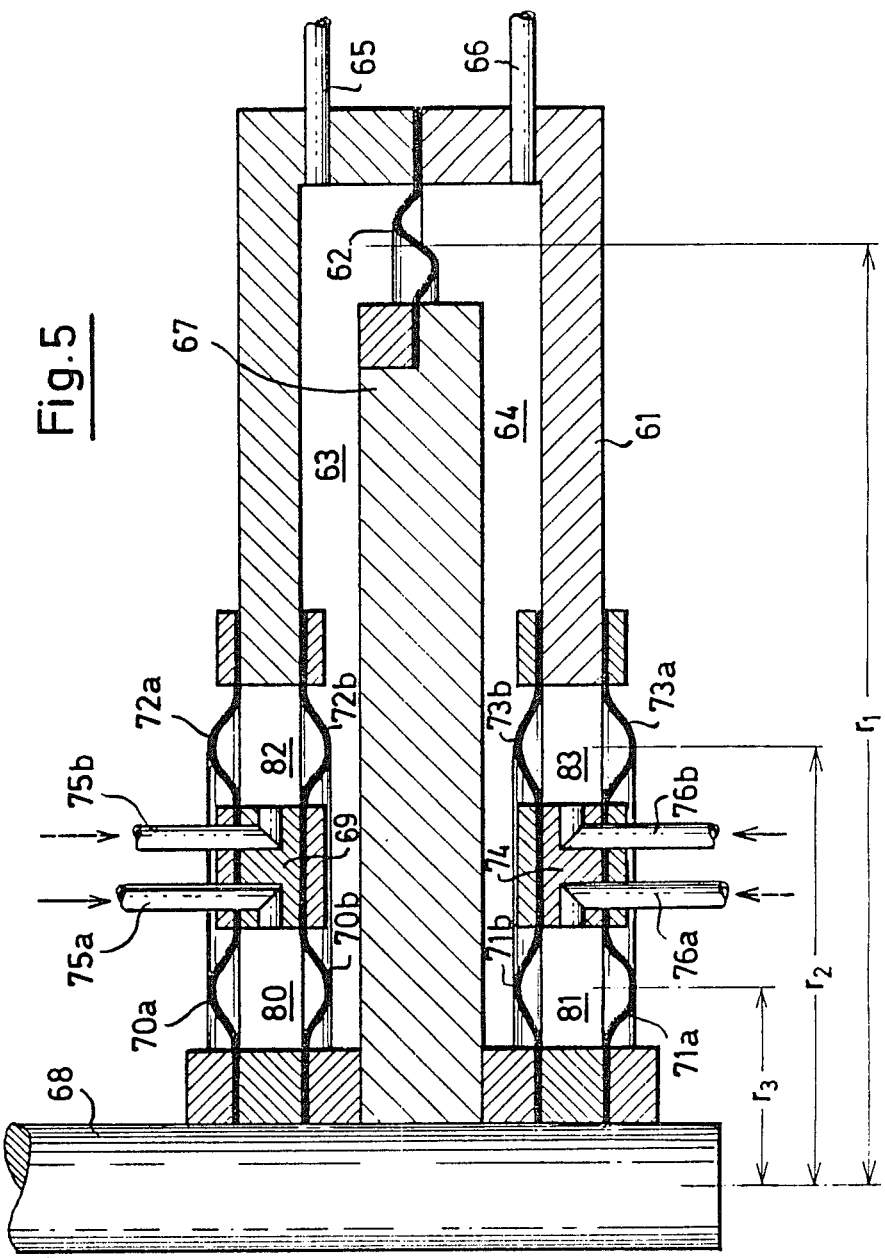
FIG. 5 is an alternate configuration of a pressure plate located at a support point of a combined active and passive support system pursuant to another embodiment of the invention.

In FIG. 5, the housing 61 encloses both chambers (63, 64) and the push rod 68 attached to the pressure plate 67 is sealed with respect to the housing 61 at the upper and at the lower ends by two concentrically arranged pairs of bellows which can be stiffened. The pair of bellows [(70a, 70b) and (72a, 72b)] at the upper end and the pair of bellows [(71a, 71b) and (73a, 73b)] at the lower end of the push rod 68 again comprise—like the pair of bellows [(22a, 22b) and (32a, 32b)] in the embodiment of FIG. 2—two individual membranes [(70a, 70b) and (72a, 72b)] lying opposite each other as well as membranes [(71a, 71b) and (73a, 73b)] and are separated from each other by respective rigid intermediate rings (69, 74). Supply conduits are attached to the intermediate rings (69, 74) through which the chambers (80, 82) as well as (81, 83) between the membranes can be charged with pressure and the bellows formed by the membranes can be stiffened.

In order to produce a force on the pressure plate 67 for the condition of equal pressure in both chambers (63, 64), the conduits (75a, 76b) and the conduits (75b, 76a) are connected to corresponding ones of the pressure cells of the actuator utilized for that purpose shown in FIGS. 3 or 4, and the pressure in the chambers (80, 83) of the bellows (70, 73) is changed in the same direction but in the direction opposite to the pressure in the chambers (81, 82) of the bellows (71, 72).

Through this measure, the upper and lower walls of the housing 61 are varied with respect to their inner radii and the part (belonging to the push rod 68 and pressure plate 67) adjoining these walls is varied in its outer radius on the upper side and the lower side of the housing 61. Accordingly, the intermediate ring 69, for example, is connected to the housing 61 and the intermediate ring 74 to the push rod 68 in order to remain with the description begun with respect to FIG. 2.

Figure 6A:
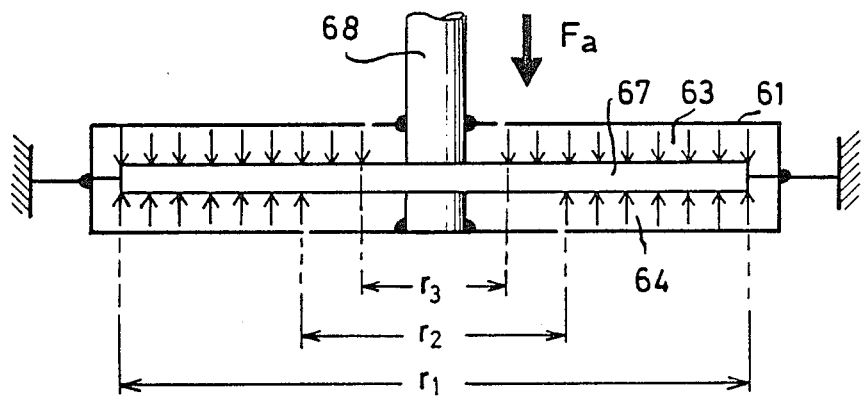
FIG. 6a is a simplified schematic for explaining the variation of the effective active surface on the pressure plate of FIG. 5; and, FIG. 6b is also a simplified schematic for explaining the variation of the effective active surface on the pressure plate of FIG. 5.
Figure 6B:
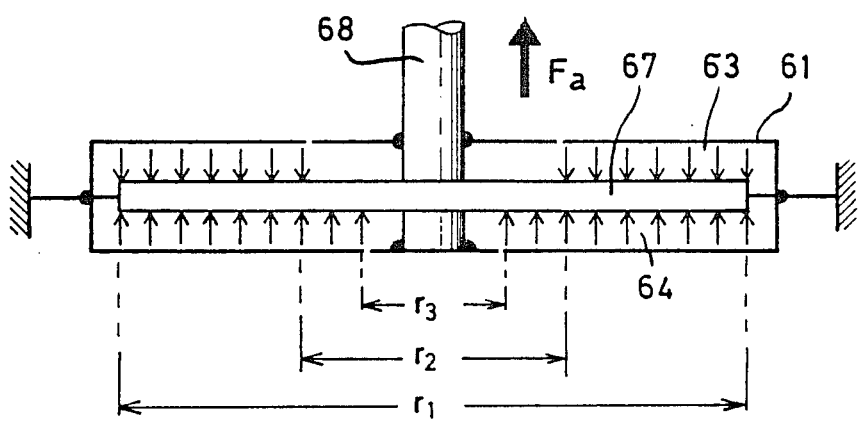

The result is seen in the illustration of FIGS. 6a and 6b. When the chambers (82, 81) are subjected to pressure and with this the bellows (72 and 71) are stiffened, the case shown in FIG. 6a occurs: the surface of the pressure plate 67 bordering on the pressure chamber 63 is larger than the surface of the pressure plate 67 bordering on the pressure chamber 64. From this condition, a resultant total force $F_a$ occurs which is directed downwardly and which is transmitted to the mirror by the push rod 28. On the other hand, if the chambers (80, 83) are subjected to pressure, that is the bellows (70, 73) are stiffened, then the reverse case illustrated in FIG. 6b occurs, that is: the effective surface of the pressure plate bordering on the pressure chamber 64 is larger than the surface of the pressure plate 67 bordering on the pressure chamber 63. Correspondingly, a resultant total force $F_a$ is obtained which is directed upwardly.

The total force $Q_t$ acting on the push rod 68 is obtained for the embodiments of FIG. 5 or FIG. 6 from the equation:

$$Q_t = P_{63} \cdot \pi \cdot (r_1^2 - r_3^2) - P_{64} \cdot \pi \cdot (r_1^2 - r_2^2) \tag{2}$$

With the aid of this formula, it is apparent that the force exerted by the push rod 68 on the mirror can also be varied when the pressures in the pressure chambers (63, 64) are equal.

It is understood that the foregoing description is that of the preferred embodiments of the invention and that various changes and modifications may be made thereto without departing from the spirit and scope of the invention as defined in the appended claims.

What is claimed is:

1. A passive and active support system for a telescope mirror comprising:
   a plurality of support units for supporting the mirror at respective support points thereon;
   each of said support units including: a housing; a member movably mounted in said housing and operatively connected to said mirror; and, said member having structure means for partitioning said housing into first and second pressure chambers;
   said structure means defining surface means subjected to the pressures in said chambers;
   hydraulic interconnecting means for hydraulically interconnecting the respective first and second chambers of said support units with each other to provide a passive, astatic arrangement wherein a hydraulic fluid applies pressure to said surface means to establish a passive hydraulic support of said mirror via said member; and,
   control means for changing the effective area of said surface means subjected to said pressures so as to cause said fluid to impart an additional force $F_a$ to said member thereby actively supporting said mirror.

2. The passive and active support system of claim 1, said movable member including: a movable rod movably mounted in said housing and operatively connected to said mirror at a corresponding one of said support points; and, said structure means including a pressure plate fixedly attached to said rod and defining said surface means; and,
   said control means including: bellows means forming part of said plate; and, actuator means for selectively stiffening and relaxing said bellows means for changing said effective area of said surface means.

3. The passive and active support system of claim 2, said actuator means including means for changing the pressure inside said bellows means.

4. The passive and active support system of claim 2, said plate having a circular configuration and said bellows means including first and second mutually concentric bellows units interconnecting said housing and said plate; and, said actuator means including an actuator connected to said first and second bellows units so as to reduce the pressure in one of said bellows units while simultaneously increasing the pressure in the other one of said bellows units.

5. The passive and active support system of claim 1, said movable member including: a movable rod movably mounted in said housing and operatively connected to said mirror at a corresponding one of said support points; and, said structure means including a pressure plate fixedly attached to said rod and defining said surface means; and,
   said control means including first and second bellows units forming part of said pressure plate; and, electrically adjustable pressure cells communicating with corresponding ones of said first and second bellows units for generating the pressure therein.

6. The passive and active support system of claim 1, said member including: a movable rod movably mounted in said housing and operatively connected to said mirror at a corresponding one of said support points; and, said structure means including a pressure plate fixedly attached to said rod and defining said surface means; and,
   said control means including: bellows means forming part of said housing; and, actuator means for selectively stiffening and relaxing said bellows means for changing the pressure acting on said surface means.

7. The passive and active support system of claim 1, said movable member including: a movable rod movably mounted in said housing and operatively connected to said mirror at a corresponding one of said support points; and, said structure means including a pressure plate fixedly attached to said rod and defining said surface means; and,
   said control means including: first and second bellows units forming part of said housing; and, electrically adjustable pressure cells communicating with corresponding ones of said first and second bellows units for generating the pressure therein.

8. A passive and active support system for a telescope mirror comprising:
   a plurality of support units for supporting the mirror at respective support points thereon;
   each of said support units including: a housing; a member movably mounted in said housing and operatively connected to said mirror; and, said member having a plate disposed in said housing so as to partition the latter into first and second pressure chambers;
   said plate having a first surface bounding said first chamber and a second surface bounding said second chamber;
   hydraulic interconnecting means for hydraulically interconnecting the respective first and second chambers of said support units with each other to provide a passive, astatic arrangement wherein hydraulic fluid applies pressure forces to said first and second surfaces which act in mutually opposite directions on the support point corresponding to said support unit; and, control means for changing the effective surface area of said first surface on which the pressure in said first chamber acts and for changing the effective surface area of said second surface on which the pressure in said second chamber acts in mutually opposite directions to thereby develop an active supporting force ($F_a$) for actively supporting said mirror.

* * * * *